(12) United States Patent
Awano (10) Patent No.: US 10,618,367 B2
(45) Date of Patent: Apr. 14, 2020

(54) DAMPER CONTROL DEVICE AND SUSPENSION APPARATUS

(71) Applicant: KYB Corporation, Tokyo (JP)

(72) Inventor: Koichiro Awano, Tokyo (JP)

(73) Assignee: KYB CORPORATiON, Tokyo (JP)

( * ) Notice: Subject to any disclaimer, the term of this patent is extended or adjusted under 35 U.S.C. 154(b) by 159 days.

(21) Appl. No.: 15/578,545

(22) PCT Filed: Jun. 2, 2016

(86) PCT No.: PCT/JP2016/066377
§ 371 (c)(1),
(2) Date: Nov. 30, 2017

(87) PCT Pub. No.: WO2017/022316
PCT Pub. Date: Feb. 9, 2017

(65) Prior Publication Data
US 2018/0154729 A1 Jun. 7, 2018

(30) Foreign Application Priority Data

Jul. 31, 2015 (JP) .................. 2015-152964

(51) Int. Cl.
*B60G 17/016* (2006.01)
*B62K 25/04* (2006.01)
*B60G 17/015* (2006.01)
*B60G 17/08* (2006.01)
*B60G 17/018* (2006.01)

(52) U.S. Cl.
CPC ....... *B60G 17/0164* (2013.01); *B60G 17/015* (2013.01); *B60G 17/018* (2013.01);
(Continued)

(58) Field of Classification Search
CPC .......... B60G 2300/12; B60G 2400/053; B60G 2400/0533; B60G 2400/104;
(Continued)

(56) References Cited

U.S. PATENT DOCUMENTS

| 5,193,845 A | 3/1993 | Yokote et al. |
| 2002/0039951 A1 | 4/2002 | Hasegawa |

(Continued)

FOREIGN PATENT DOCUMENTS

| EP | 1623856 A2 | 2/2006 |
| EP | 2537691 A1 | 12/2012 |

(Continued)

OTHER PUBLICATIONS

Mar. 7, 2019, European Search Report issued for related EP Application No. 16832595.9.

(Continued)

*Primary Examiner* — Anthony R Jimenez
(74) *Attorney, Agent, or Firm* — Paratus Law Group, PLLC (57) ABSTRACT

There is provided a damper control device and a suspension apparatus that are capable of effectively preventing a posture change such as pitching or rolling of the body of a vehicle. To achieve the above object, a damper control device of the present invention is designed to control a damping force of a damper in accordance with a rate of change in acceleration or a rate of change in angular acceleration. If there is a time delay in the rising of the acceleration acting on the vehicle body with respect to the driving operation being performed by the driver of the vehicle, the rate of change in the acceleration has a phase lead relative to the acceleration, and accordingly, the rate of change has only a short time delay with respect to the driving operation.

12 Claims, 6 Drawing Sheets

(52) U.S. Cl.
 CPC ......... *B60G 17/0162* (2013.01); *B60G 17/08* (2013.01); *B62K 25/04* (2013.01); *B60G 2300/12* (2013.01); *B60G 2400/053* (2013.01); *B60G 2400/0533* (2013.01); *B60G 2400/104* (2013.01); *B60G 2400/106* (2013.01); *B60G 2800/012* (2013.01); *B60G 2800/014* (2013.01)

(58) Field of Classification Search
 CPC ........ B60G 2400/106; B60G 2800/012; B60G 2800/014; B60G 17/015; B60G 17/0162; B60G 17/018; B60G 17/08; B62K 25/04
 USPC .......................................................... 701/37
 See application file for complete search history.

(56) References Cited

U.S. PATENT DOCUMENTS

| | | |
|---|---|---|
| 2003/0230886 A1 | 12/2003 | Yamazaki et al. |
| 2006/0047387 A1 | 3/2006 | Izawa et al. |
| 2006/0224287 A1 | 10/2006 | Izawa et al. |
| 2011/0074139 A1 | 3/2011 | Kobayashi et al. |
| 2012/0310479 A1 | 12/2012 | Liu et al. |
| 2014/0214274 A1 | 7/2014 | Liu et al. |

FOREIGN PATENT DOCUMENTS

| | | |
|---|---|---|
| JP | H01-195194 | 8/1989 |
| JP | H05-238235 | 9/1993 |
| JP | 2001-030728 A | 2/2001 |
| JP | 2001-047832 A | 2/2001 |
| JP | 2003-063473 A | 3/2003 |
| JP | 2003-276668 A | 10/2003 |
| JP | 2006-281876 A | 10/2006 |
| JP | 2011-073633 A | 4/2011 |
| JP | WO2011/101997 A1 | 6/2013 |

OTHER PUBLICATIONS

May 28, 2019, Japanese Office Action issued for related JP Application No. 2015-152964.

DAMPER CONTROL DEVICE AND SUSPENSION APPARATUS

CROSS REFERENCE TO PRIOR APPLICATION

This application is a National Stage Patent Application of PCT International Patent Application No. PCT/JP2016/066377 (filed on Jun. 2, 2016) under 35 U.S.C. § 371, which claims priority to Japanese Patent Application No. 2015-152964 (filed on Jul. 31, 2015), which are all hereby incorporated by reference in their entirety.

TECHNICAL FIELD

The present invention relates to improvements on a damper control device and a suspension apparatus.

BACKGROUND ART

An example of a control device that controls the damping force of a damper provided between the body of a vehicle and a wheel is a control device that detects the acceleration acting on the vehicle body with an acceleration sensor, and, if the acceleration is such an acceleration as to slow down the vehicle, prevents a nosedive of the vehicle body by increasing the damping force generated by the damper, as disclosed in JP 2003-063473 A. That is, this control device monitors the acceleration, and, if the acceleration acting on the vehicle body becomes such an acceleration as to reduce the vehicle speed and exceeds a set value, prevents the nosedive by increasing the damping force of the damper.

Other than the above, there is a known control device that prevents a nosedive of a vehicle body by increasing the damping force generated by a damper in accordance with an input of a brake signal, instead of an acceleration (see Patent Literature 1, for example).

SUMMARY OF THE INVENTION

In such a conventional control device, there is a time delay in the behavior of the vehicle with respect to the driving operation being performed by the driver of the vehicle.

Therefore, it is not possible to effectively prevent a nosedive of the vehicle body by sensing a decrease in the vehicle speed or a brake signal with a sensor and controlling the damping force of the damper.

As for a squat or rolling of the vehicle body, it is not possible to effectively prevent a squat or rolling of the vehicle body simply by sensing an acceleration and controlling the damping force of the damper, for the same reason as above.

Therefore, a conventional control device cannot effectively prevent posture changes, such as pitching, which is rotation of the vehicle body in the forward or backward direction like a nosedive or a squat, and rolling, which is rotation of the vehicle body in a transverse direction.

Therefore, the present invention has been made to solve the above problems, and an object of the present invention is to provide a damper control device and a suspension apparatus that can effectively prevent a posture change such as pitching or rolling of the body of a vehicle.

To achieve the above object, a damper control device of the present invention controls the damping force of a damper in accordance with a rate of change in acceleration or a rate of change in angular acceleration.

DESCRIPTION OF EMBODIMENTS

Figure 1:
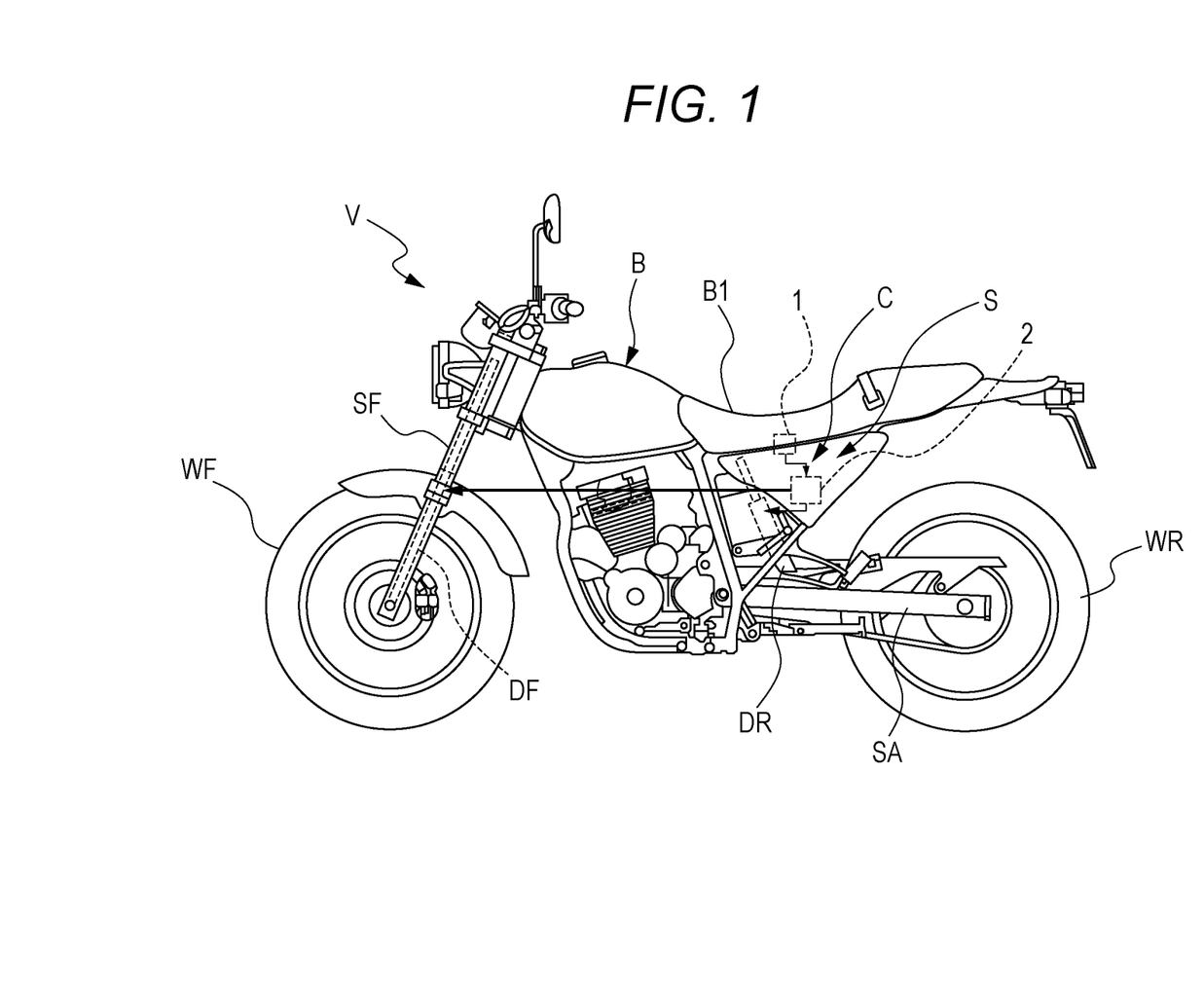
FIG. 1 is a system configuration diagram of a suspension apparatus according to an embodiment.
Figure 2:
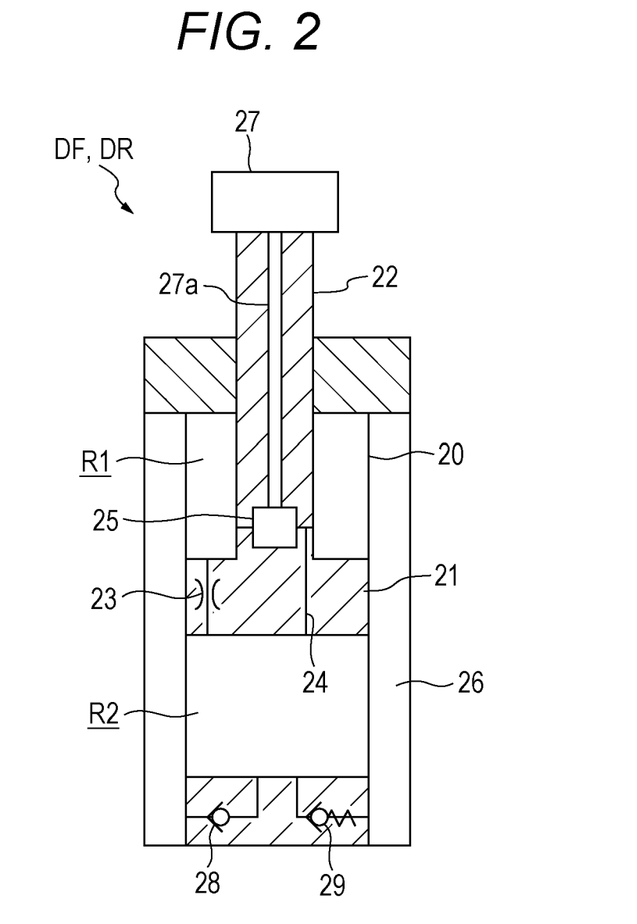
FIG. 2 is a schematic view of a damper.

The following is a description of the present invention, with reference to the embodiments illustrated in the drawings. As shown in FIGS. 1 and 2, a suspension apparatus S according to an embodiment includes a front-wheel-side damper DF provided between the body B of a vehicle V that is a vehicle with a saddle and the front wheel WF, a rear-wheel-side damper DR that is a rear-wheel-side damper provided between the vehicle body B and the rear wheel WR, and a damper control device C.

As for the details of the respective components, the vehicle V is a motorcycle that is a vehicle with a saddle in this example. Meanwhile, the front-wheel-side damper DF is housed together with a front-wheel-side suspension spring (not shown) in a front fork SF provided between the vehicle body B and the front wheel WF, and generates a damping force at a time of expansion/contraction. Further, the rear-wheel-side damper DR is disposed together with a rear-wheel-side suspension spring (not shown) between the vehicle body B and a swing arm SA holding the rear wheel WR in a rotatable state, and generates a damping force at a time of expansion/contraction.

As shown in FIG. 2, the front-wheel-side damper DF and the rear-wheel-side damper DR in this example each include: a cylinder 20; a piston 21 that is slidably inserted into the cylinder 20, and divides the inside of the cylinder 20 into an expansion-side chamber R1 and a contraction-side chamber R2; a piston rod 22 that is movably inserted into the cylinder 20, and is joined to the piston 21; a damping valve 23 that is provided on the piston 21, and connects the expansion-side chamber R1 and the contraction-side chamber R2; a bypass passage 24 that bypasses the damping valve 23, and connects the expansion-side chamber R1 and the contraction-side chamber R2; a damping force adjustment valve 25 provided in the bypass passage 24; a reservoir 26 that supplies or removes hydraulic oil with the piston rod 22 moving into and out of the cylinder 20 when hydraulic oil becomes excessive or short in the cylinder 20; a suction passage 28 that allows hydraulic oil only to flow from the reservoir 26 toward the contraction-side chamber R2; and a contraction-side valve 29 that applies resistance to hydraulic oil flowing from the contraction-side chamber R2 toward the reservoir 26.

Although not specifically shown in the drawing, the damping force adjustment valve 25 in this example has: an expansion-side hard position that applies a high resistance to hydraulic oil flowing from the expansion-side chamber R1 toward the contraction-side chamber R2, and applies a low resistance to hydraulic oil flowing in the opposite direction; a contraction-side hard position that applies a high resistance to hydraulic oil flowing from the contraction-side chamber R2 toward the expansion-side chamber R1, and applies a low resistance to hydraulic oil flowing in the opposite direction; and a medium position that applies an intermediate resistance to both hydraulic oil flowing from the expansion-side chamber R1 toward the contraction-side chamber R2 and hydraulic oil flowing from the contraction-side chamber R2 toward the expansion-side chamber R1. In this example, the damping force adjustment valve 25 is connected to an actuator 27 via a control rod 27a, and can switch to each position when driven by the actuator 27. The damping force adjustment valve 25 may be the rotary valve disclosed in JP 05-238235 A, for example, but is not necessarily the rotary valve.

As described above, there are two kinds of flows of hydraulic oil: a flow of hydraulic oil passing through the damping valve 23, and a flow of hydraulic oil flowing into the bypass passage 24 through the damping force adjustment valve 25.

In a case where the damping force adjustment valve 25 is in the expansion-side hard position, a high resistance is applied to hydraulic oil flowing through the bypass passage 24 when both of the dampers DF and DR expand, and therefore, both of the dampers DF and DR exhibit damping characteristics with a great damping coefficient. In the case where the damping force adjustment valve 25 is in the expansion-side hard position, however, only a low resistance is applied to hydraulic oil flowing through the bypass passage 24 when both of the dampers DF and DR contract, and therefore, both of the dampers DF and DR exhibit damping characteristics with a small damping coefficient. Because of this, in the case where the damping force adjustment valve 25 is in the expansion-side hard position, the front-wheel-side damper DF and the rear-wheel-side damper DR are in an expansion-side hard mode in which the damping coefficient is great on the expansion side and is small on the contraction side. In the expansion-side hard mode, the damping force adjustment valve 25 can also adjust the valve opening by adjusting the position of the actuator 27. In this manner, the damping force adjustment valve 25 can adjust the expansion-side damping force while minimizing the contraction-side damping force.

In a case where the damping force adjustment valve 25 is in the contraction-side hard position, only a low resistance is applied to hydraulic oil flowing through the bypass passage 24 when both of the dampers DF and DR expand, and therefore, both of the dampers DF and DR exhibit damping characteristics with a small damping coefficient. In the case where the damping force adjustment valve 25 is in the contraction-side hard position, however, a high resistance is applied to hydraulic oil flowing through the bypass passage 24 when both of the dampers DF and DR contract, and therefore, both of the dampers DF and DR exhibit damping characteristics with a great damping coefficient. Because of this, in the case where the damping force adjustment valve 25 is in the contraction-side hard position, the front-wheel-side damper DF and the rear-wheel-side damper DR are in a contraction-side hard mode in which the damping coefficient is small on the expansion side and is great on the contraction side. In the contraction-side hard mode, the damping force adjustment valve 25 can also adjust the valve opening by adjusting the position of the actuator 27. In this manner, the damping force adjustment valve 25 can adjust the contraction-side damping force while minimizing the expansion-side damping force.

In a case where the damping force adjustment valve 25 is in the medium position, an intermediate resistance is applied to hydraulic oil flowing through the bypass passage 24 whether both of the dampers DF and DR expand or contract, and therefore, both of the dampers DF and DR exhibit damping characteristics with an intermediate damping coefficient. Because of this, in the case where the damping force adjustment valve 25 is in the medium position, the front-wheel-side damper DF and the rear-wheel-side damper DR are in a medium mode in which the damping coefficient is an intermediate damping coefficient on both the expansion and contraction sides.

The control device C includes: an acceleration sensor 1 that is provided on the body B of the vehicle V, and detects accelerations in the forward and backward directions of the vehicle body B; and a control unit 2 that controls damping forces generated by the two dampers DF and DR, by determining damping force command values of the two dampers DF and DR in accordance with an acceleration $\alpha$ detected by the acceleration sensor 1 and then driving the actuator 27.

As shown in FIG. 1, the acceleration sensor 1 is set immediately below the seat B1 that is provided on the body B of the vehicle V and is to be sat on by the rider, and is designed to detect accelerations in the forward and backward directions of the vehicle body B. The acceleration sensor 1 outputs an acceleration acting on the vehicle body B in the forward direction as an acceleration with a positive value, and outputs an acceleration acting on the vehicle body B in the backward direction as an acceleration with a negative value.

Figure 3:
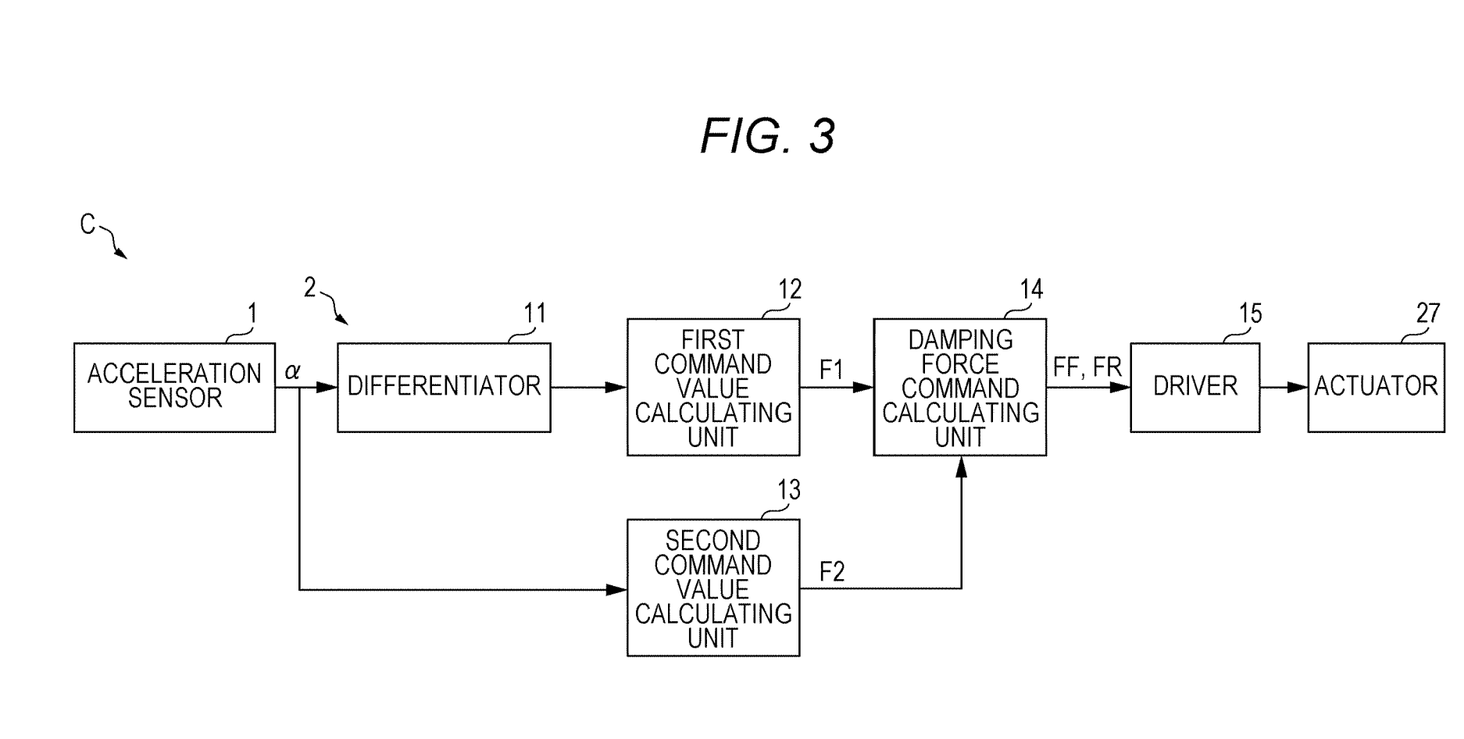
FIG. 3 is a control block diagram of a damper control device according to an embodiment.

The control unit 2 processes signals output from the acceleration sensor 1 to determine damping force command values as the commands to be supplied to the actuators 27 of the respective dampers DF and DR, and supplies electric currents to the actuators 27 as instructed by the damping force command values.

Specifically, as shown in FIG. 3, the control unit 2 includes: a differentiator 11 that differentiates the acceleration $\alpha$ detected by the acceleration sensor 1, to calculate a rate of change in the acceleration $\alpha$; a first command value calculating unit 12 that calculates a first command value F1 through a map calculation using the rate of change in the acceleration $\alpha$ as the parameter; a second command value calculating unit 13 that calculates a second command value F2 through a map calculation using the acceleration $\alpha$ as the parameter; a damping force command value calculating unit 14 that calculates a front-wheel-side damping force command value FF and a rear-wheel-side damping force command value FR in accordance with the first command value F1 and the second command value F2; and a driver 15 that supplies electric currents to the actuators 27 of the respective dampers DF and DR in accordance with the current amounts indicated by the respective damping force command values FF and FR.

Figure 4:
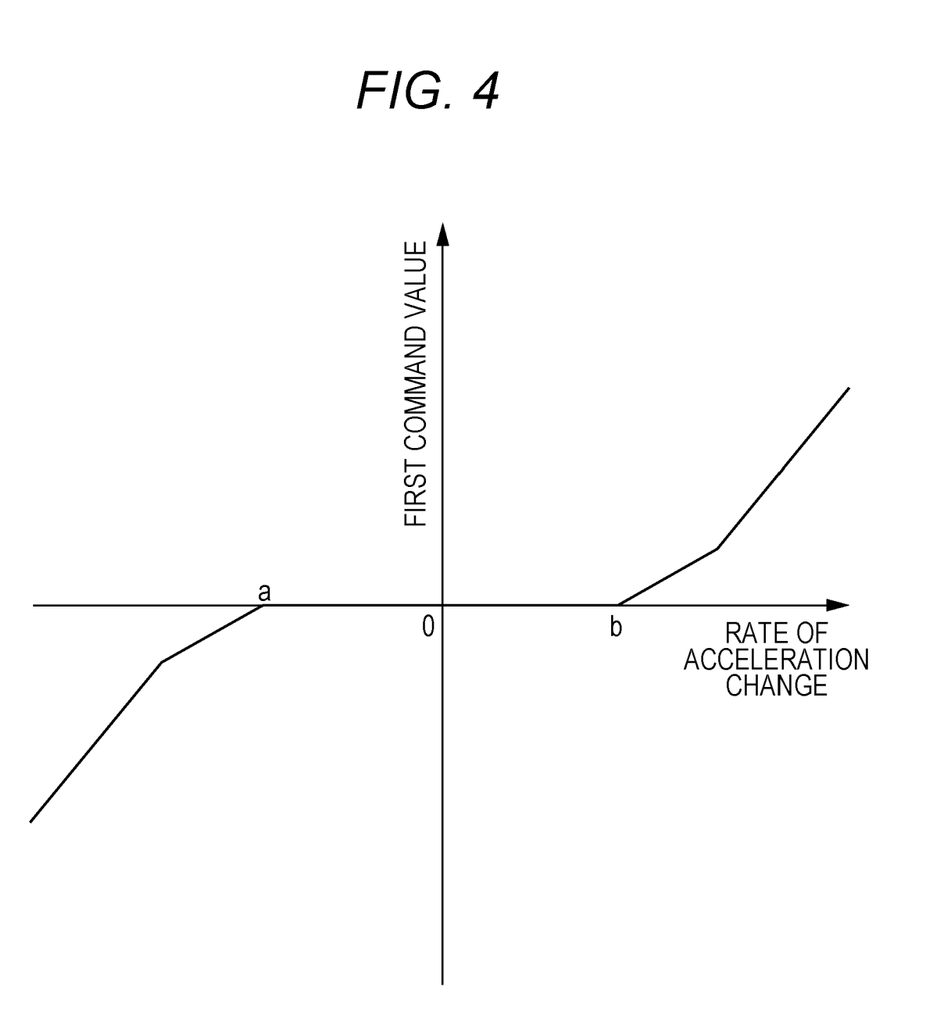
FIG. 4 is a map showing the relationship between a rate of change in acceleration and a first command value.

The first command value calculating unit 12 holds a map in which the relationship between the rate of change in the acceleration $\alpha$ and the first command value F1 is mapped in advance, so as to calculate the first command value F1 by using the rate of change in the acceleration $\alpha$ as the parameter. The first command value calculating unit 12 calculates the first command value F1 from the rate of change in the acceleration $\alpha$. In this map, a dead zone in which the first command value F1 is 0 is set in the region in which the rate of change in the acceleration $\alpha$ is "a" to "b", as shown in FIG. 4. As the rate of change becomes lower and lower below "a", the decrease of the first command value F1 becomes gradually larger. As the rate of change becomes higher and higher above "b", the increase of the first command value F1 becomes gradually larger. As long as "a"

is smaller than "b", any numerical values can be set as "a" and "b", which define the dead zone. In a case where "a" is a negative value while "b" is a positive value, a region including 0 as the rate of change in the acceleration α can be set as the dead zone. Alternatively, in a case where both "a" and "b" are either positive values or negative values, a region in which the rate of change in the acceleration α is positive, or a region in which the rate of change in the acceleration α is negative can be set as the dead zone. Also, the values of "a" and "b" are set so that a dead zone suitable for the vehicle V in which the suspension apparatus S is to be used can be set. Further, as shown in FIG. 4, in the regions outside the dead zone, the slope of the characteristic line of the first command value F1 with respect to increase and decrease of the rate of change in the acceleration α changes, and the change is a non-linear change. Therefore, in a case where the rate of change in the acceleration α is slightly lower than "a" on the negative side or is slightly higher than "b" on the positive side, the absolute value of the first command value F1 is relatively small. However, if the rate of change is much lower than "a" on the negative side or is much higher than "b" on the positive side, the absolute value of the first command value F1 is a very large value. Since the first command value F1 changes non-linearly with the rate of change as described above, the relationship between the first command value F1 and the rate of change is mapped, and the first command value calculating unit 12 calculates the first command value F1 through a map calculation. However, the first command value F1 may be calculated through a function calculation, instead of a map calculation. Alternatively, outside the dead zone, the first command value F1 may change linearly with the rate of change in the acceleration α.

Figure 5:
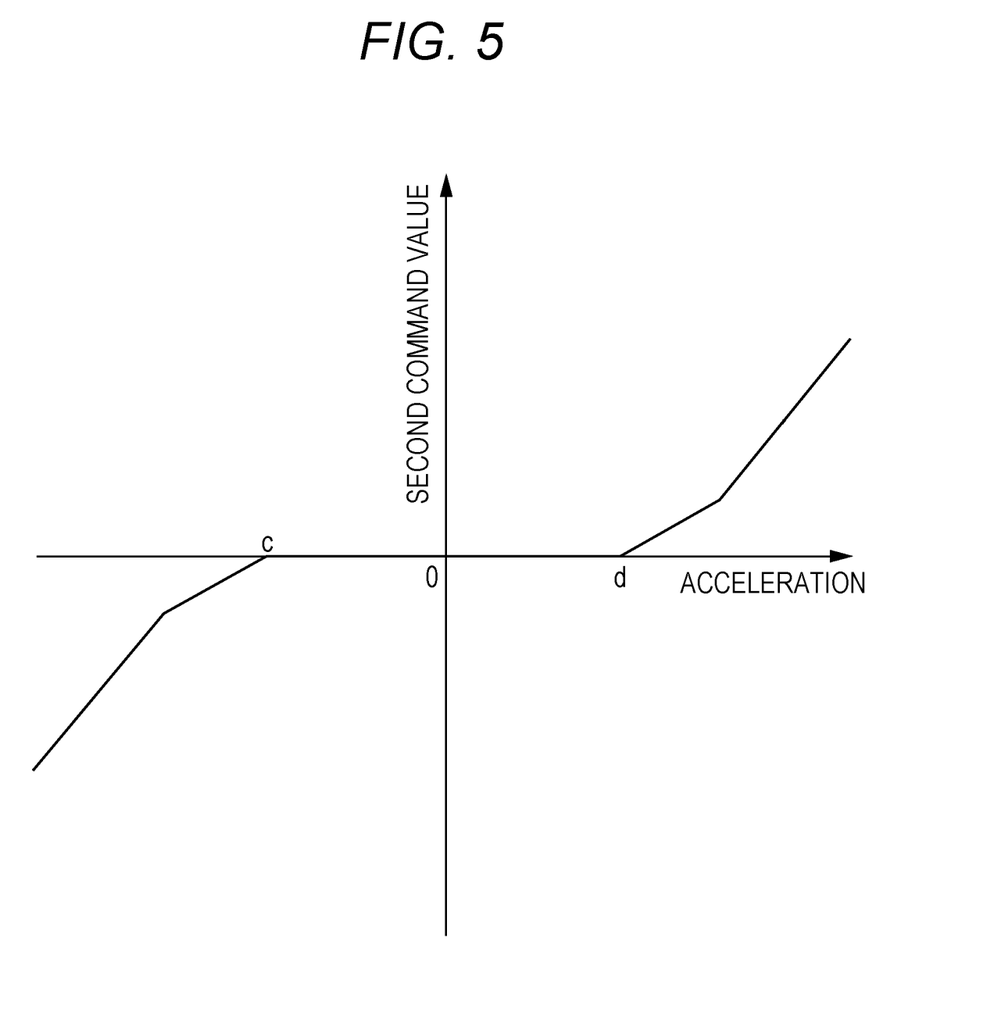
FIG. 5 is a map showing the relationship between acceleration and a second command value.

The second command value calculating unit 13 holds a map in which the relationship between the acceleration α and the second command value F2 is mapped in advance, so as to calculate the second command value F2 by using the acceleration α as the parameter. The second command value calculating unit 13 calculates the second command value F2 from the acceleration α. In this map, a dead zone in which the second command value F2 is 0 is set in the region in which the acceleration α is "c" to "d", as shown in FIG. 5. As the acceleration α becomes lower and lower below "c", the decrease of the second command value F2 becomes gradually larger. As the acceleration α becomes higher and higher above "d", the increase of the second command value F2 becomes gradually larger. As long as "c" is smaller than "d", any numerical values can be set as "c" and "d", which define the dead zone. In a case where "c" is a negative value while "d" is a positive value, a region including 0 as the acceleration α can be set as the dead zone. Alternatively, in a case where both "c" and "d" are either positive values or negative values, a region in which the acceleration α is positive, or a region in which the acceleration α is negative can be set as the dead zone. As for the values of "c" and "d", "c" and "a" may be set at the same value or at different values, and "b" and "d" may be set at the same value or at different values, as long as a dead zone suitable for the vehicle V in which the suspension apparatus S is to be used can be set. Further, as shown in FIG. 5, in the regions outside the dead zone, the slope of the characteristic line of the second command value F2 with respect to increase and decrease of the acceleration α changes, and the change is a non-linear change. Therefore, in a case where the acceleration α is slightly lower than "c" on the negative side or is slightly higher than "d" on the positive side, the absolute value of the second command value F2 is relatively small. However, if the acceleration α is much lower than "c" on the negative side or is much higher than "d" on the positive side, the absolute value of the second command value F2 is a very large value. Since the second command value F2 changes non-linearly with the acceleration α as described above, the relationship between the second command value F2 and the acceleration α is mapped, and the second command value calculating unit 13 calculates the second command value F2 through a map calculation. However, the second command value F2 may be calculated through a function calculation, instead of a map calculation. Alternatively, outside the dead zone, the second command value F2 may change linearly with the acceleration α.

The damping force command value calculating unit 14 calculates a sum of the first command value F1 and the second command value F2, sets the sum as the front-wheel-side damping force command value FF, and reverses the sign of the sum to obtain the rear-wheel-side damping force command value FR. In a case where the front-wheel-side damping force command value FF is a positive value, and the rear-wheel-side damping force command value FR is a negative value, an acceleration in the forward direction acts on the vehicle body B, and a moment rotating in the forward direction acts on the vehicle body B. In this situation, the front-wheel-side damper DF increases the contraction-side damping force while reducing the expansion-side damping force, and the rear-wheel-side damper DR increases the expansion-side damping force while reducing the contraction-side damping force, so that a forward roll of the vehicle body B is prevented by the damping forces of the dampers DF and DR. Therefore, in a case where the front-wheel-side damping force command value FF is a positive value, and the rear-wheel-side damping force command value FR is a negative value, the damping force adjustment valve 25 of the front-wheel-side damper DF is put into the contraction-side hard position, and the damping force adjustment valve 25 of the rear-wheel-side damper DR is put into the expansion-side hard position. In this manner, anti-dive control to prevent a nosedive of the vehicle body B can be performed.

In a case where the front-wheel-side damping force command value FF is a negative value, and the rear-wheel-side damping force command value FR is a positive value, on the other hand, an acceleration in the backward direction acts on the vehicle body B, and a moment rotating in the backward direction acts on the vehicle body B. In this situation, the front-wheel-side damper DF increases the expansion-side damping force while reducing the contraction-side damping force, and the rear-wheel-side damper DR increases the contraction-side damping force while reducing the expansion-side damping force, so that a backward roll of the vehicle body B is prevented by the damping forces of the dampers DF and DR. Therefore, in a case where the front-wheel-side damping force command value FF is a negative value, and the rear-wheel-side damping force command value FR is a positive value, the damping force adjustment valve 25 of the front-wheel-side damper DF is put into the expansion-side hard position, and the damping force adjustment valve 25 of the rear-wheel-side damper DR is put into the contraction-side hard position. In this manner, control to prevent a squat of the vehicle body B can be performed.

In a case where the acceleration α and the rate of change in the acceleration α are in the dead zone of the second command value F2 and the dead zone of the first command value F1, respectively, there is no need to prevent pitching of the vehicle body B, and therefore, both the damping force command values FF and FR are 0. In this case, the damping force adjustment valve 25 of each of the dampers DF and DR is put into the medium mode.

The driver 15 includes a drive circuit that supplies electric currents to the actuators 27. In accordance with instructions indicated by the damping force command values FF and FR calculated in the above described manner, the driver 15 supplies electric currents to the actuators 27. In a case where each damping force adjustment valve 25 is a rotary valve that enables both selection of each of the above described positions and adjustment of the valve opening, and each actuator 27 is a stepping motor, the driver 15 supplies electric currents as described below. Specifically, the driver 15 supplies pulse currents to the actuators 27 that are stepping motors, to rotationally drive the damping force adjustment valves 25 to such positions as to generate the damping forces indicated by the damping force command values FF and FR, for example. The driver 15 supplies pulse currents to the actuators 27 in this manner, and the positions of the damping force adjustment valves 25 and the valve openings are adjusted as instructed by the damping force command values FF and FR as described above. Thus, the damping forces of the dampers DF and DR are controlled.

In a case where each damping force adjustment valve 25 is a spool valve that enables both selection of each of the above described positions and adjustment of the valve opening, and each actuator 27 is a solenoid, the driver 15 supplies electric currents as described below. Specifically, the driver 15 supplies electric currents with the current amounts corresponding to the command values FF and FR to the actuators 27 that are solenoids, to drive the damping force adjustment valves 25 to such positions as to generate the damping forces indicated by the damping force command values FF and FR, for example. It should be noted that the driver 15 detects the electric currents flowing through the actuators 27, and controls the electric currents flowing into the actuators 27 through current feedback control. The driver 15 supplies electric currents to the actuators 27 in this manner, and the positions of the damping force adjustment valves 25 and the valve openings are adjusted as instructed by the damping force command values FF and FR as described above. Thus, the damping forces of the dampers DF and DR are controlled.

Although not shown in the drawings, the hardware resources for the respective components of the above described control unit 2 are formed as a known system. A specific example of such a system includes: an amplifier for amplifying signals output from the acceleration sensor 1; a converter that converts analog signals into digital signals; a computer system that includes a central processing unit (CPU), a memory device such as a read only memory (ROM), a random access memory (RAM), a crystal oscillator, and a bus line that connects these components; and a drive circuit that forms part of the driver 15 and drives the actuators 27. The control procedures for processing each signal, calculating damping force command values, and controlling the driver 15 are stored as a program beforehand into the ROM or some other memory device.

Since the above described control unit 2 is a known computer system in terms of hardware, the control unit 2 may not be prepared separately, but may be integrated into an electronic control unit (ECU) if the vehicle V in which the damper control device C is mounted includes the ECU.

Figure 6:
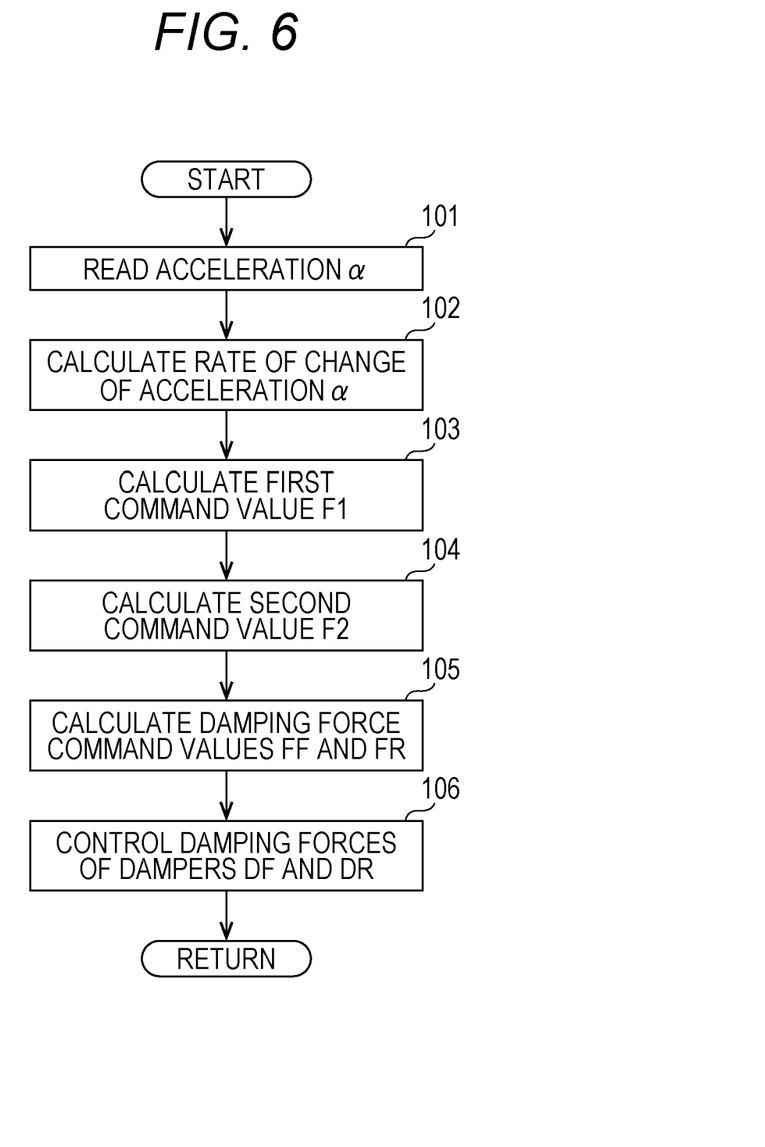
FIG. 6 is a flowchart showing an example of the procedures for calculating damping force command values in a damper control device according to an embodiment.

Referring now to the flowchart shown in FIG. 6, the procedures to be carried out by the above described control unit 2 of the damper control device C are described. First, the control unit 2 reads the acceleration α detected by the acceleration sensor 1 (step 101). The control unit 2 then calculates the rate of change in the acceleration α (step 102), calculates the first command value F1 from the rate of change (step 103), calculates the second command value F2 from the acceleration α (step 104), and calculates the damping force command values FF and FR from the first command value F1 and the second command value F2 (step 105). The control unit 2 further causes the driver 15 to supply electric currents to the actuators 27, and thus, controls the damping forces of the respective dampers DF and DR (step 106). The control unit 2 repeatedly carries out steps 101 through 106, to control the damping forces of the dampers DF and DR.

As the control unit 2 performs the above described series of processes, the processes to be performed by the differentiator 11, the first command value calculating unit 12, the second command value calculating unit 13, the damping force command value calculating unit 14, and the driver 15 are performed. These components are formed by the CPU reading the program and executing the above calculating operations.

The damper control device C and the suspension apparatus S are configured as described above, and are designed to control the damping forces of the respective dampers DF and DR in accordance with the rate of change in the acceleration α. If there is a time delay in the rising of the acceleration α acting on the vehicle body B with respect to the driving operation being performed by the driver of the vehicle V, the rate of change in the acceleration α has a phase lead relative to the acceleration α, and accordingly, the rate of change has only a short time delay with respect to the driving operation. In view of this, when damping control is performed in accordance with the rate of change, the damping force of each of the dampers DF and DR can be made to rise earlier than the conventional timing. Thus, the damper control device C and the suspension apparatus S can effectively prevent pitching of the vehicle body B. The rate of change is not necessarily a rate of change in the acceleration of the vehicle body B in the forward/backward direction, but may be a rate of change in the angular acceleration of the vehicle body B in the forward/backward direction. In a case where the rate of change in the angular acceleration is used, a rate sensor should be provided in place of the acceleration sensor 1.

In a case where the vehicle with a saddle is a four-wheel vehicle or a three-wheel vehicle, and the layout is such that dampers are arranged on the right and left sides of the body of the vehicle, the damping forces of the right-wheel-side damper and the left-wheel-side damper may be controlled. In this case, the damping forces of the right-wheel-side damper and the left-wheel-side damper are controlled in accordance with the acceleration in the transverse direction or the rate of change in angular acceleration, so that rolling of the vehicle body can also be prevented without a delay in the driving operation.

As described above, with the damper control device C and the suspension apparatus S, posture changes such as pitching and rolling of the body B of the vehicle V can be effectively prevented.

In a case where only the damping force of either the front-wheel-side damper DF or the rear-wheel-side damper DR is controlled, pitching can be prevented. However, where the damping forces of both the front-wheel-side damper DF and the rear-wheel-side damper DR are controlled, pitching of the vehicle body B can be more effectively prevented by the damping forces of both of the dampers DF and DR. If the vehicle with a saddle is a four-wheel vehicle or a three-wheel vehicle, it is possible to prevent rolling of the vehicle body by controlling the damping force of only one of the dampers provided on the right and left sides of the vehicle body B. However, in a case where rolling is prevented by the damping forces of both the right-wheel-side damper and the left-wheel-side damper, rolling of the vehicle body B can be more effectively prevented.

Further, in the control device C and the suspension apparatus S of this example, damping force command values are calculated in accordance with the acceleration α and the rate of change in the acceleration α, or an angular acceleration and the rate of change in the angular acceleration, and one or both of the damping forces of the dampers DF and DR are controlled. As a result of this, the damping force command values can be made to increase in proportion not only to the rate of change in the acceleration α or the rate of change in angular acceleration, but also to the acceleration α or the angular acceleration. Even though the rate of change in the acceleration α or the rate of change in the angular acceleration becomes lower after rising without any time delay with respect to the driving operation, the acceleration α or the angular acceleration, which causes a posture change such as pitching or rolling of the vehicle body B, might be maintained at a great value in some cases. Even in such cases, the dampers DF and DR can increase the damping forces to prevent posture changes of the vehicle body B, and thus, effective posture control can be performed. That is, while the vehicle body B is going through a posture change such as pitching or rolling, the dampers DF and DR continuously generates such damping forces as to prevent posture changes. Thus, excellent posture control can be performed.

In this example, a dead zone in which the first command value F1 is 0 with respect to the rate of change in the acceleration α, and a dead zone in which the second command value F2 is 0 with respect to the acceleration α are set. With such dead zones, there is no need to perform unnecessary control when posture restriction control is unnecessary because the amount of change in the posture such as pitching or rolling is small. Furthermore, there is no risk of posture restriction control being performed in a case where noise is superimposed on the acceleration detected by the acceleration sensor 1, and the vehicle body B does not have any posture change in practice.

In a case where the vehicle V is a vehicle with a saddle, and the sensor (acceleration sensor 1) that detects the acceleration α or an angular acceleration is provided below the seat B1 of the vehicle V, the acceleration α or the angular acceleration of a portion close to the center of gravity of the vehicle body B including the rider can be detected. Thus, more effective posture control can be performed on the vehicle body B, and any feeling of strangeness is not caused in the rider during the posture control.

Further, in this example, the damper DF (DR) has the expansion-side hard mode in which the damping characteristics on the expansion side are "hard", and the damping characteristics on the contraction side are "soft", and the contraction-side hard mode in which the damping characteristics on the expansion side are "soft", and the damping characteristics on the contraction side are "hard". In a case where the damper DF (DR) is configured as above, the damper DF (DR) can automatically function as a skyhook damper, which is advantageous when skyhook control is additionally employed as well as the posture control to prevent pitching and rolling of the vehicle body B.

The damping force adjustment valve 25 of each of the dampers DF and DR may be a damping valve that simply opens and closes the bypass passage 24, or a damping valve that can adjust the valve opening, and opens and closes the bypass passage 24. In this case, each of the dampers DF and DR does not have the expansion-side hard mode to reduce the contraction-side damping coefficient while increasing the expansion-side damping coefficient, and the contraction-side hard mode to reduce the expansion-side damping coefficient while increasing the contraction-side damping coefficient. However, each of the dampers DF and DR can adjust the damping force to a greater value or a smaller value. Even in the dampers DF and DR configured in this manner, the damping forces on the expansion and contraction sides can be increased or reduced, and thus, the effect of the present invention to effectively prevent a posture change such as pitching or rolling of the vehicle body B is not lost.

Further, in a case where the working fluid of each of the dampers DF and DR is an electroviscous fluid or a magnetoviscous fluid, an electrode or a coil that applies an electric field or a magnetic field, instead of the damping force adjustment valve 25, may be provided in the bypass passage 24 so that damping force can be adjusted. Also, in this case, the bypass passage 24 may be removed, and an electrode or a coil, instead of the damping valve 23, may be provided in the passage that connects the expansion-side chamber R1 and the contraction-side chamber R2.

The invention claimed is:

1. A damper control device configured to control a damping force of a damper provided between a body of a vehicle and a wheel, in accordance with at least one of
   a rate of change in acceleration in one of a forward/backward direction or a transverse direction of the body of the vehicle, or
   a rate of change in angular acceleration in one of the forward/backward direction or the transverse direction of the body,
   wherein a first command value is calculated by using the rate of change in the acceleration as a first parameter and a second command value is calculated by using the acceleration as a second parameter, or the first command value is calculated by using the rate of change in the angular acceleration as the first parameter and the second command value is calculated by using the angular acceleration as the second parameter, and
   wherein a sum of the first command value and the second command value is set as a damping force command value used to control the damping force of the damper.

2. The damper control device according to claim 1, wherein
   the damper includes a front-wheel-side damper provided between the body of the vehicle and a front wheel, and a rear-wheel-side damper provided between the body of the vehicle and a rear wheel, and
   damping forces of the front-wheel-side damper and the rear-wheel-side damper are controlled by calculating the damping force command value in accordance with
      the rate of change in the acceleration in the forward/backward direction of the body of the vehicle and the acceleration in the forward/backward direction of the body, or
      the rate of change in the angular acceleration in the forward/backward direction of the body and the angular acceleration in the forward/backward direction of the body.

3. A suspension apparatus comprising:
   a damper configured to have an expansion-side hard mode to make damping characteristics on an expansion side hard while making damping characteristics on a contraction side soft, and a contraction-side hard mode to make the damping characteristics on the expansion side soft while making the damping characteristics on the contraction side hard; and the damper control device according to claim 2.

4. The damper control device according to claim 2, wherein the vehicle is a motorcycle, and a sensor configured to detect at least one of the acceleration or the angular acceleration is provided under a seat of the vehicle.

5. A suspension apparatus comprising:

a damper configured to have an expansion-side hard mode to make damping characteristics on an expansion side hard while making damping characteristics on a contraction side soft, and a contraction-side hard mode to make the damping characteristics on the expansion side soft while making the damping characteristics on the contraction side hard; and the damper control device according to claim 4.

6. The damper control device according to claim 1, wherein the damper includes a right-wheel-side damper provided between the body of the vehicle and a right wheel, and a left-wheel-side damper provided between the body of the vehicle and a left wheel, and damping forces of the right-wheel-side damper and the left-wheel-side damper are controlled by calculating the damping force command value in accordance with the rate of change in the acceleration in the transverse direction of the body of the vehicle and the acceleration in the transverse direction of the body, or the rate of change in the angular acceleration in the transverse direction of the body and the angular acceleration in the transverse direction of the body.

7. A suspension apparatus comprising:

a damper configured to have an expansion-side hard mode to make damping characteristics on an expansion side hard while making damping characteristics on a contraction side soft, and a contraction-side hard mode to make the damping characteristics on the expansion side soft while making the damping characteristics on the contraction side hard; and the damper control device according to claim 6.

8. The damper control device according to claim 6, wherein the vehicle is a motorcycle, and a sensor configured to detect at least one of the acceleration or the angular acceleration is provided under a seat of the vehicle.

9. A suspension apparatus comprising:

a damper configured to have an expansion-side hard mode to make damping characteristics on an expansion side hard while making damping characteristics on a contraction side soft, and a contraction-side hard mode to make the damping characteristics on the expansion side soft while making the damping characteristics on the contraction side hard; and the damper control device according to claim 8.

10. The damper control device according to claim 1, wherein the vehicle is a motorcycle, and a sensor configured to detect at least one of the acceleration or the angular acceleration is provided under a seat of the vehicle.

11. A suspension apparatus comprising:

a damper configured to have an expansion-side hard mode to make damping characteristics on an expansion side hard while making damping characteristics on a contraction side soft, and a contraction-side hard mode to make the damping characteristics on the expansion side soft while making the damping characteristics on the contraction side hard; and the damper control device according to claim 10.

12. A suspension apparatus comprising:

a damper configured to have an expansion-side hard mode to make damping characteristics on an expansion side hard while making damping characteristics on a contraction side soft, and a contraction-side hard mode to make the damping characteristics on the expansion side soft while making the damping characteristics on the contraction side hard; and the damper control device according to claim 1.

* * * * *